United States Patent [19]

Heian

[11] 4,236,887

[45] Dec. 2, 1980

[54] METHOD AND APPARATUS FOR HANDLING AND UTILIZING SYSTEM OFF-GAS IN A PYRO-PROCESSING SYSTEM

[75] Inventor: Glenn A. Heian, Franklin, Wis.

[73] Assignee: Allis-Chalmers Corporation, Milwaukee, Wis.

[21] Appl. No.: 41,240

[22] Filed: May 21, 1979

[51] Int. Cl.$^3$ .......................................... F27B 15/00
[52] U.S. Cl. ................................ 432/14; 106/100; 432/16; 432/18; 432/106
[58] Field of Search .................. 432/14, 16, 18, 106; 106/100

[56] References Cited

U.S. PATENT DOCUMENTS

| 3,920,380 | 11/1975 | Heian | 432/106 |
| 4,047,884 | 9/1977 | Heian | 432/106 |

Primary Examiner—John J. Camby
Attorney, Agent, or Firm—Robert C. Jones

[57] ABSTRACT

Preheat gas is recycled to a booster heater that communicates with the preheat chamber with excess gas being directed to a quench chamber. From the quench chamber gas passes to a dust separator with the cleansed gas being utilized in low- and high-temperature drying chambers. The system is modified so as to have a mixing vessel ahead of the quench chamber in which lime dust is introduced to scrub the gas passing through prior to the gas being quenched. The gas is cleansed and utilized in a drying chamber.

26 Claims, 2 Drawing Figures

METHOD AND APPARATUS FOR HANDLING AND UTILIZING SYSTEM OFF-GAS IN A PYRO-PROCESSING SYSTEM

FIELD OF THE INVENTION

This invention relates to a method and apparatus for utilizing and handling system gas so as to optimize kiln and grate conditions and improve thermal efficiency by reducing the volume of ambient air and thereby reducing the volume of gases that must be handled. This reduces the operating cost.

BACKGROUND OF THE INVENTION

In view of the increase cost of energy, a major consideration in the operating cost of a pyro-processing system is its energy economy. It is also of importance that gas be cleaned prior to venting to stack and not in itself be a source of pollution.

As herein set forth, the kiln of the present system is only supplied with the necessary gas that it requires for its function. With this condition there is less waste of heat from the kiln which in previous arrangements has been wasted. Preheat off-gas at about 700 degrees F., is recirculated and the temperature boosted to the desired temperature. With the present arrangement, it is possible to bypass a larger percentage but a lower quantity of dirty kiln gas with less penalty on the system. This is true because the arrangement provides for recouping 700 degrees F. gas and wasting less high-temperature kiln off-gas. The kiln off-gas becomes the predominant source of the mass of gas required for drying and preheating. This permits all zones to be balanced according to their requirements prior to venting waste gas to the atmosphere. Thus, only gas that cannot be utilized in the system is wasted.

A general object of the present invention is to recycle system off-gas utilizing the heat therein for the system process.

Still another object of the present invention is to boost the temperature of the preheat off-gas and utilize this gas on the grate.

Yet another object of the present invention is to bypass a higher concentration of dirty gas from the kiln by reducing the gas flow through the kiln.

A further object of the present invention is to provide a means whereby it is possible to balance kiln conditions to improve kiln system operating conditions and minimize waste gas temperature and volume.

A still further object of the present invention is to provide for three recycle potentials: (1) preheat gas recycle; (2) high-temperature drying recycle; and, (3) low-temperature drying recycle.

SUMMARY OF THE INVENTION

Preheat off-gas is recycled to a booster air heater in communication with the preheat zone so that the temperature of the preheat off-gas is raised and directed back into the preheat zone for improvement in system efficiency. Excess gas needed for drying is directed to a quench zone and utilized in the high-temperature drying zone and also in the low-temperature drying zone.

DETAILED DESCRIPTION OF THE INVENTION

Figure 1:
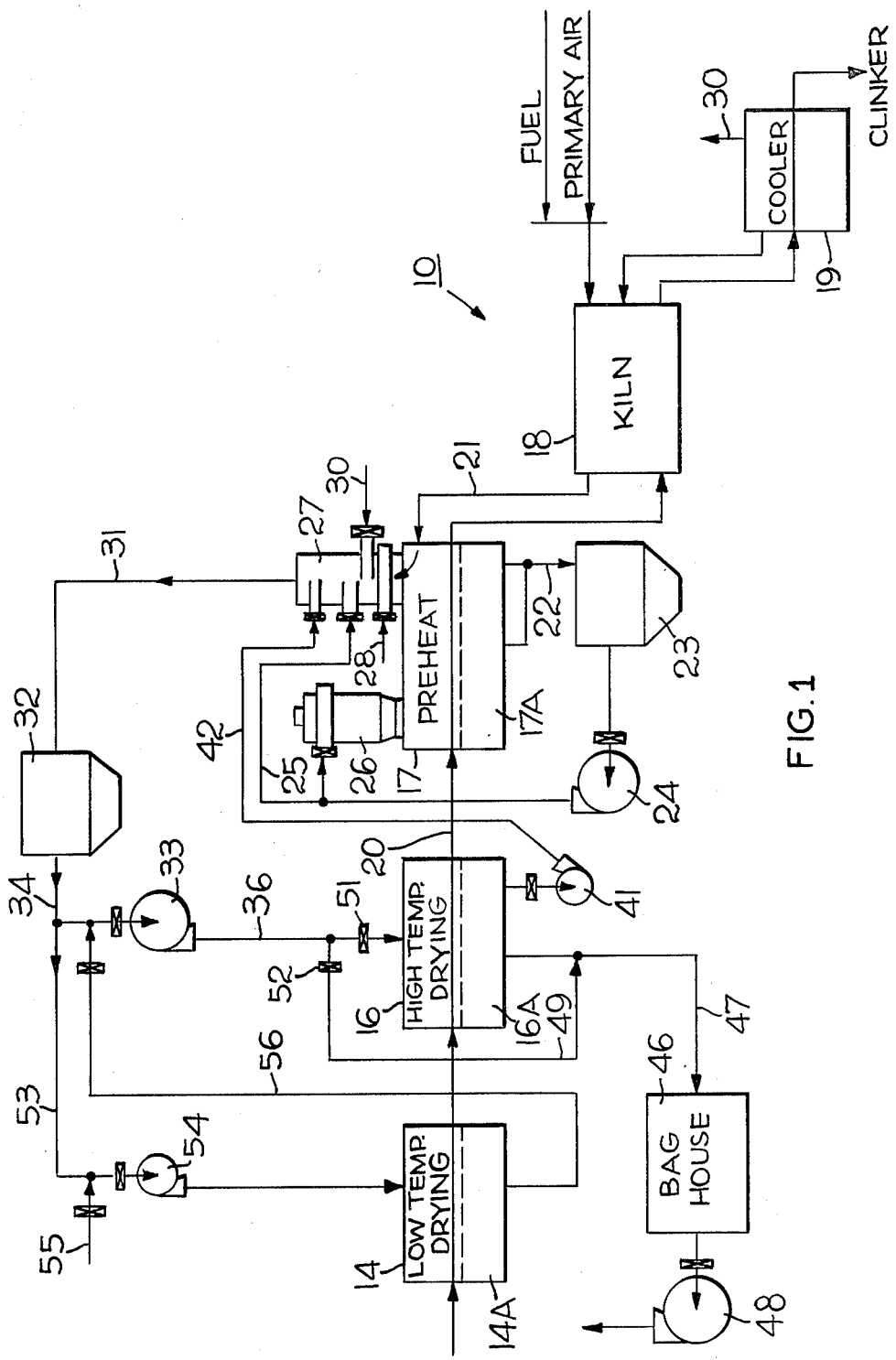
FIG. 1 is a diagrammatic view of a grate kiln system incorporating the features of the present invention; and, FIG. 2 is a diagrammatic view of a grate kiln system incorporating a modification of the invention disclosed in FIG. 1.

A grate kiln system 10 is diagrammatically shown in FIG. 1 and includes a low-temperature drying zone or chamber 14, a high-temperature drying zone or chamber 16 and a preheat zone or chamber 17, all connected in a series-flow relationship in the usual manner. A traveling grate indicated by the material-flow line 20 progresses the wet agglomerate material through the low-temperature drying, high-temperature drying and preheat zones with the material being discharged into a kiln 18 and thence to a cooler 19. Below the traveling grate 20 each of the zones 14, 16 and 17 include negative-pressure chambers 14A, 16A and 17A, respectively. Gas from the inlet end of kiln 18 flows through the material preheat zone 17 via a conducting duct means 21 in the usual manner. This gas flow from the kiln to the preheat zone will be in a temperature range of approximately 1,600 degrees to 2,400 degrees F. Off-gas from the preheat negative-pressure chamber 17A that passes through the grate is directed by means of suitable duct means 22 to a dust collector 23. From the dust collector 23 the gas is drawn by means of a preheat fan 24 and directed into the inlet of a booster heater 26 which is in communication with the interior of the preheat zone 17. The recycled preheat gas at an elevated temperature is utilized in the preheat zone for the material on the grate. By utilizing the booster heater 26 directly in communication with the preheat zone 17, the preheat off-gas from the negative-pressure chamber 17A is recycled and utilized in the system, thereby decreasing the volume of process gas required from the kiln. Thus, the recycling of the preheat gas reduces the need for a greater volume of gas from the kiln and reduces the amount of energy necessary to provide the required heat to the preheat zone.

The arrangement so far disclosed teaches a method and also the apparatus for practicing the method for providing supplemental heat that is needed for the material on the grate, and this is accomplished via the booster heater 26. Thus, instead of bypassing the preheat off-gas around the system and pulling an excessive amount of gas through the kiln 18 and bypassing it off at a high temperature, say around 1800 degrees to 2000 degrees F., the arrangement provides for recovering the recirculated off-gas at about 700 degrees F. and the temperature elevated by operation of the booster heater 26. With the arrangement, there is less heat lost through the bypass system if there should be a high bypass requirement. It is, thus, apparent that a higher concentration of dirty gas is bypassed from the kiln by reducing the gas flow through the kiln. This arrangement improves the efficiency of the system and it is possible to balance the kiln conditions and also to balance the preheat conditions as required; and, finally, it is possible to balance the drying temperature in the two zones as required and minimize waste gas temperature and volume.

Excess preheat off-gas not recycled back to the preheat zone is directed via a duct 25 to a quench chamber 27 in which tempering air is provided through a duct 28 at the lower end of the quench chamber 27.

The quenched gas is directed via a duct 31 into a mechanical dust collector 32 which operates to remove a high percentage of pollutants from the gas stream. A drying supply fan 33, connected via duct 34 to the mechanical dust collector 32, operates to draw the gas from the dust collector and directs the gas via a duct 36 back to the high-temperature drying zone 16 as downdraft drying heat thereto. Gas passing through the grate in the high-temperature drying zone 16 is partially utilized in the quench chamber to reduce the amount of ambient tempering air to be admitted to the quench chamber 27. The off-gas from the high-temperature drying negative-pressure chamber 16A is drawn off by a recycle fan 41 which is connected by a duct 42 to an inlet of the quench chamber 27. The balance of the off-gas from the high-temperature drying negative-pressure wind box or chamber 16A are directed to a final dust collector herein depicted as a bag house or electrostatic precipitator 46 by means of a duct 47 which operates to remove most of the pollutants from the gas stream before they are drawn by means of a waste gas fan 48 and vented to a waste gas stack (not shown). There is a bypass around the high-temperature drying zone 16 so that in case of necessity, if the waste gas coming from the high-temperature drying negative-pressure chamber 16A to a final dust collector such as a bag house 46 is too low, gas from the duct 36 may be bypassed around the high-temperature drying zone via a duct 49 and into the duct 47 to raise the temperature of the off-gas coming from the high-temperature drying negative-pressure chamber or wind box 16A. This branch duct 49 will also be utilized for venting the system during a heat-up condition and when the system is not operating. Under this condition, a damper 51 in duct 36 will be closed while a damper 52 in the bypass duct 49 is open to permit the control volume of gas to bypass around the high-temperature drying zone as desired.

Some of the gas coming from the quench chamber 27 through the mechanical dust collector 32 can be utilized in the low-temperature drying zone 14 as down-draft drying gas. As shown, this gas is directed to drying zone 14 via a duct 53 connected to a fan 54. This gas in the duct 53 may be at a temperature not suitable for low-temperature drying zone use—that is, the temperature of the gas may be too high. Thus, a bleed-in 55 is provided ahead of the fan 54 for reducing the temperature of the gas that is supplied for down-draft drying in the low-temperature drying zone. Off-gas from the low-temperature drying negative-pressure chamber 14A is directed via a duct 56 to the duct 34, and thence to the inlet of the drying supply fan 33 and utilized as quench air to improve the efficiency of the system. The system as herein described is a method and apparatus for recycling internal gas which contains a fair amount of heat and which can be utilized in the system to reduce the energy input for operating the system. With the arrangement shown, some of the heat is usable on the hot end of the high-temperature drying zone and recovers some of the off-gas therefrom and utilizes it as quench air for the very high-temperature gas coming off the quench chamber 27.

It is apparent, therefore, that the system described includes three recycled potentials: (1) the preheat off-gas recycle; (2) the high-temperature drying recycle; and, (3) low-temperature drying recycle which minimizes the amount of ambient air needed to be bled into the system and obviously improves the economy of the system, both thermal and gas volume.

Figure 2:
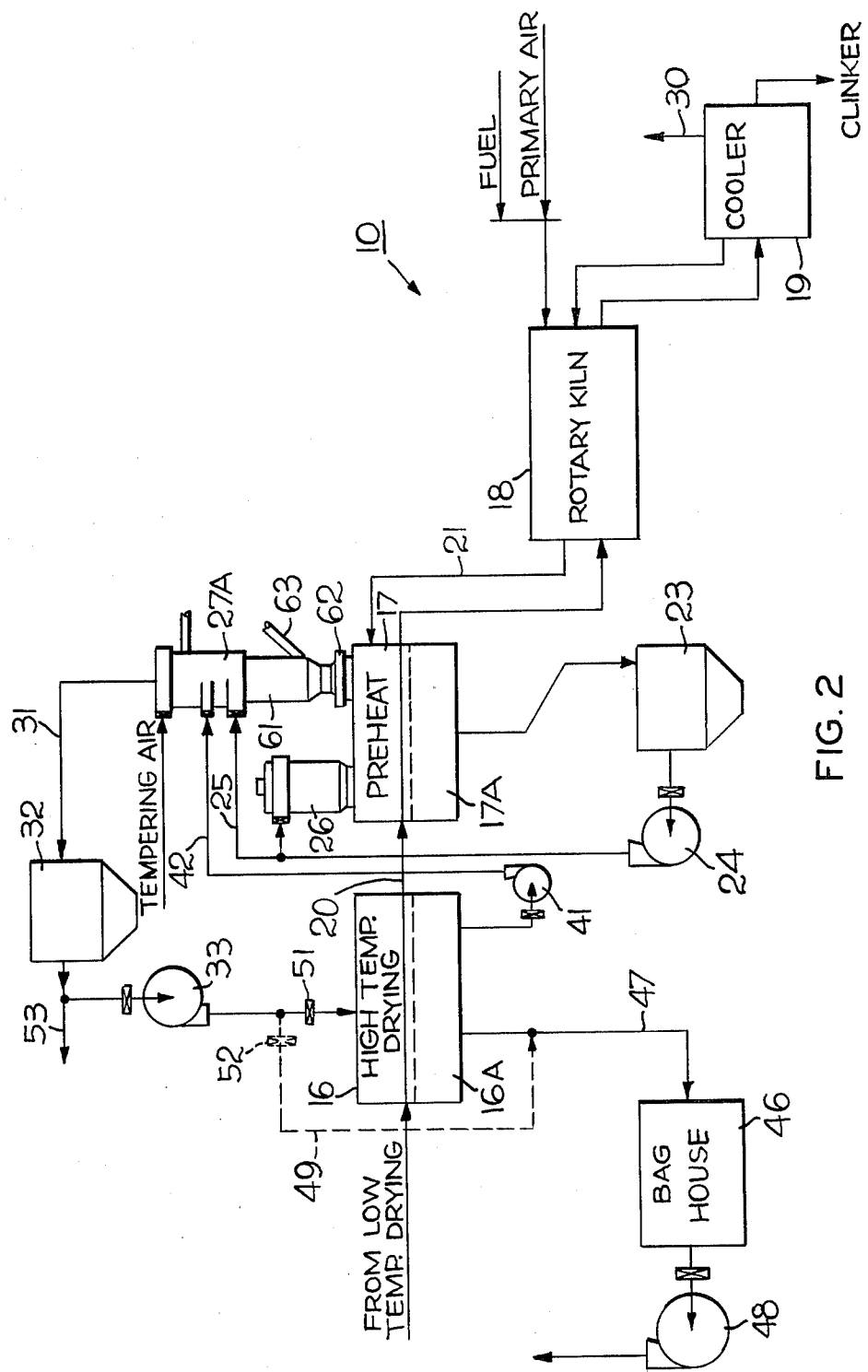

In FIG. 2 a modification of the invention, disclosed in FIG. 1, is shown. As shown, the quench chamber 27A is integrated with an adsorption chamber 61 which is in communication with the interior of the preheat zone 17. A tempering air manifold 62 is provided at the bottom of the adsorption chamber 61 for reducing the temperature of the kiln off-gas passing through the preheat zone into the adsorption chamber 61.

The dirty kiln off-gas passing into the adsorption chamber 61 is scrubbed therein. To this purpose sorbent material, such as lime or alkali bearing dust from a convenient source, such as process dust or grate fall-through, is supplied to the adsorption chamber via a duct 63.

EXAMPLE

For the purposes of the test, emission gas was simulated by combustion gases from a natural gas fuel burner into which pure sulfur dioxide gas was injected in the emission gas duct, ahead of the gas inlet to the mixing vessel. The rate of injection of sulfur dioxide gas was such as to bring the sulfur dioxide content of gas entering the mixing vessel 61 to a base level of 2500 p.p.m. This base level took account of the sulfur content of coal that was used to fuel the burner of the calcining furnace but did not take account of sulfur present in the adsorption medium.

Natural gas was burned at a rate to generate 300,000 BTU/hr., and 27 to 32 lbs./hr. (12.2–14.5 kg./hr.) of powdered coal (10,500 BTU/lb.) was fed to the calcining furnace. To maintain the 2500 p.p.m. $SO_2$ baseline it was necessary to inject 6.4 lbs. per hour (2.9 kg./hr.) of gaseous sulfur dioxide into the simulated emission gas stream. An additional 1.1 lbs./hr. (0.5 kg./hr.) of $SO_2$ was found to be obtained from the adsorbing medium, so that the $SO_2$ content of the gas entering the mixing zone 61 was actually about 2920 p.p.m.

The raw feed to the calcining furnace was kerogen-bearing Colorado shale found to have the following analysis:

| | |
|---|---|
| CaO content (as CaO) | 44.1% |
| SiO | 9.2 |
| $Al_2O_3$ | 3.0 |
| $Fe_2O_3$ | 1.2 |
| MgO | 0.5 |
| $SO_3$ | 2.2 |
| Alkalis ($K_2O$, $Na_2O$) | 1.2 |
| L.O.I. (i.e., materials lost on ignition-$CO_2$ and kerogen) | 38.5 |
| | 99.9 |

The gas passing through the mixing vessel 61 had a 7.2% to 7.3% $CO_2$ content, derived from the combustion gas employed for simulation of emission gas, from fuel burned for calcining, and by release from the adsorption medium in calcining. Oxygen content of the gas through the mixing vessel was 8.0%.

During the test run, temperatures at the following specified locations were found by periodic measurement to range between the values set forth:

| | |
|---|---|
| In the calcining vessel | 890°–960° C. |
| At the wing burners of the calcining furnace | 420°–450° |
| In the mixing zone | 560°–590° |
| At the outlet from the mixing vessel | 520°–540° |
| In the duct ahead of the | |

| -continued | |
|---|---|
| emission gas inlet | 840°–860° |

It should be noted that the thermal insulation of the pilot plant, although adequate for test purposes, would have been unsatisfactory for efficient gas scrubbing in actual operation, and heat losses due to insulation deficiencies are reflected in some of the above temperature values. With completely satisfactory insulation, there would probably be no need to use the preheater.

During the test period, the rate at which new shale material was fed into the system was measured on the basis of the CaO content of the feed material and was 26.9 lbs./hr. (12.2 kg./hr.). The feed material was comminuted to a Blaine Number of 6100. Discharge of material to the waste chamber was at the rate of 32 lbs./hr. (14.5 kg./hr.), and material was discharged to the bag house at the rate of 20.5 lbs./hr. (9.3 kg./hr.). It must be borne in mind that the weight of discharge material includes both the weight of sulfur dioxide adsorbed by the medium and that of fly ash from combusted coal (at the rate of 1 to 1.2 kg. per hour) which was separated from the gas stream along with the adsorption medium.

The amount of adsorbing medium constantly in the system as a recirculating load was 160 to 185 lbs. (72.6 to 83.9 kg.). The ratio of CaO content of fresh feed material to $SO_2$ content of the simulated emission gas was 4.2 times that needed for stoichiometric reaction.

At a location where no dilution of the scrubbed emission gas had occurred, the $SO_2$ content of the emission gas was found to be 1100 p.p.m., measured with an accuracy of ±30 p.p.m. On the basis of the nominal 1100 p.p.m. value and the 2500 p.p.m. base line value, the system was removing 56% of the sulfur content of the emission gas. The $SO_2$ content of the emission gas is expected to be further reduced by additional adsorption in the balance of system and by natural dilution by other process gases to at least 200 p.p.m.

For removal of sulfur and phosphorous gases from emission gases, lime (calcium oxide) will naturally be the preferred adsorbing medium, due to its low cost and availability; but where, for example, titanium oxide is to be recovered from emission gas, it may be desirable to use an oxide of one of the other alkali earth metals, as to take advantage of special properties of such adsorbing medium in its combination with the recovered or adsorbed material.

The embodiments of the invention in which an exclusive property or privilege is claimed are defined as follows:

1. An apparatus for recycling the internal gas generated in a pyro-processing system (10) in which cement material in the form of wet agglomerate is processed by grate means (20) through structure defining a drying chamber (16), a preheat chamber (17) having a negative-pressure wind box (17A), a kiln (18) and a cooler (19), the said chambers (16, 17), kiln (18) and cooler (19) being connected together in series flow arrangement;
   a booster heater (26) connected to be in communication with the interior of the preheat chamber (17);
   a dust collector (23) connected to receive off-gas from the negative-pressure wind box (17A) of said preheat chamber;
   a preheat fan (24) connected to draw the off-gas from the negative-pressure wind box (17A) of said preheat chamber through said dust collector (23) and pass a portion of the collected off-gas back to said booster heater (26);
   a quench chamber (27) connected to be in communication with the interior of the preheat chamber in position to receive kiln off-gas flowing through the preheat chamber; and
   duct means (25) connected to bypass excess preheat off-gas from the preheat fan (24) to said quench chamber (27) as quench air for the kiln off-gas passing through a preheat chamber into said quench chamber;
   whereby the temperature of the preheat off-gas is elevated and the off-gas recycled back to the preheat chamber (17) and the kiln off-gas is also conditioned for further use in the system.

2. Apparatus according to claim 1 including a dust collector (32) connected to receive off-gas from said quench-chamber;
   a drying supply fan (33) connected to said dust collector and to the drying zone (16) to add the quenched off-gas to the drying zone to effect drying.

3. Apparatus according to claim 2 including a bypass (49) from the interconnection between said drying supply fan and the drying zone around the drying zone (16) to direct quenched off-gas to the connection (47) between said final dust collector (46) and the drying zone (16) for venting the system during a start-up operation or a shut-down condition.

4. Apparatus according to claim 3 wherein there is provided a final dust collection means (46) connected to receive waste gas from the drying zone; and,
   a waste gas fan (48) connected to draw waste gas from said final dust collector means (46) and to deliver the waste gas to waste gas stack.

5. Apparatus according to claim 4 including means to add ambient air (56) to the quenched off-gas prior to said quenched off-gas being supplied to the drying zone (16).

6. Apparatus according to claim 4 wherein there is provided a means (28) to provide ambient air to the quench chamber (27) as additional temperature modifying air to the quench chamber.

7. Apparatus according to claim 4 or 6 wherein there is provided a duct means (30) connected to direct cooler recoup air to said quench chamber (27) as additional temperature modifying air to the quench chamber to minimize the volume of ambient air to said quench chamber and utilize the heat of said cooler recoup air.

8. Apparatus according to claim 7 wherein the system includes a low-temperature drying zone (14) having a negative-pressure wind box (14A);
   duct means (53) connected to receive excess quenched gas passing through said dust collector (32) and to direct the gas to the low-temperature drying zone (14) as down-draft drying air;
   a fan (54) in said duct means (53) to force quenched off-gases to the low-temperature drying zone; and
   a bleed-in (55) connected into said duct means (53) upstream of said fan (54) for modifying the temperature of the gas being supplied to the low-temperature drying zone (14) for down-draft drying to a desired temperature.

9. Apparatus according to claim 8 wherein there is also provided a recycle fan (41) connected to draw off-gas from the drying zone (16) and to direct the gas into the quench chamber (27) to reduce the volume of ambient air added to the quench chamber and utilize the heat therein.

10. Apparatus according to claim 2 wherein there is provided an adsorption chamber (61) interposed between said quench chamber (27A) and the preheat zone (17); and means (63) to supply sorbent material to said adsorption chamber (61) to scrub the kiln off-gas prior to it being quenched.

11. Apparatus according to claim 10 including means (62) to supply tempering air to the kiln off-gas prior to the off-gas passing into said adsorption chamber (61) to partially quench the kiln off-gas to control the reaction temperature for maximizing the effectiveness of the sorbent material.

12. In a process for treating wet agglomerate cement material in a pyro-processing material treating system in which the material to be treated is progressed by grate means through structure defining a drying chamber, a preheat chamber having a negative-pressure wind box in which off-gas passing through the material bed on the grate means in the preheat chamber is collected, a kiln and a cooling chamber comprising the steps:

of drawing the off-gas from the preheat chamber from the negative-pressure wind box thereof;

of treating the off-gas drawn from the negativepressure wind box to remove particles therefrom;

of directing a portion of the treated off-gas by force means to a temperature elevating means;

of elevating the temperature of a portion of the off-gas from the negative-pressure wind box of the preheat chamber;

of passing that portion of the preheat off-gas at an elevated temperature back into the preheat chamber;

of directing the kiln off-gas passing through the preheat chamber through a temperature quench chamber;

of passing the quenched off-gas of the drying chamber as drying heat;

of venting drying chamber off-gas to atmosphere.

13. A process according to claim 12 including the step of:

removing from the quenched off-gas particles therein prior to the off-gas being supplied to the drying chamber.

14. A process according to claim 13 including the step of:

supplying excess preheat off-gas to the temperature quench chamber to assist in modifying the temperature of the kiln off-gas.

15. A process according to claim 14 including the step of:

providing ambient air to the quench chamber as temperature modifying air.

16. A process according to claim 15 including the step of:

providing ambient air to the quenched off-gas prior to said quenched off-gas being supplied to the drying chamber.

17. A process according to claim 14 including the step of:

directing cooler recoup air to the quench chamber as additional temperature modifying air to minimize the volume of ambient air that is supplied to the quench chamber and to utilize the heat of said cooler recoup air.

18. A process according to claim 15 or 16 including the step:

of bypassing the quenched off-gas supplied to the drying chamber around the drying chamber for venting the system prior to start-up or shut-down.

19. A process according to claim 16 including the step of:

supplying off-gas from the drying chamber to the quench chamber to reduce the volume of ambient air to the quench chamber.

20. In a process for treating wet agglomerate cement material in pyro-processing material-treating system in which the material to be treated is progressed by grate means through a low-temperature drying chamber having a negative-pressure wind box in which off-gas passing through the material bed on the grate means in the preheat chamber is collected, a high-temperature drying chamber having a negative-pressure wind box, a preheat chamber having a negative-pressure wind box, a kiln and a cooling chamber comprising the steps of:

drawing preheat off-gas from the negative-pressure wind box of the preheat chamber;

elevating the temperature of a portion of the preheat off-gas from the negative-pressure wind box of the preheat chamber;

passing that portion of the temperature elevated preheat off-gas back into the preheat chamber;

directing kiln off-gas passing through the preheat chamber through a quench chamber;

passing excess preheat off-gas to the quench chamber to assist in modifying the temperature of the kiln off-gas directed into the quench chamber;

adding ambient air into the quench chamber to assist in modifying the temperature of the kiln off-gas;

passing the quenched kiln off-gas to the drying chamber as down-draft drying heat.

21. A process according to claim 20 including the step of:

passing off-gas from the negative-pressure wind box of the high-temperature drying chamber to the quench chamber to reduce the volume of ambient air supplied to the quench chamber.

22. A process according to claim 20 including: removing dust from the quenched kiln off-gas.

23. A process according to claim 20 including the steps of:

passing a portion of the quenched off-gas to the low-temperature drying chamber as down-draft dyring gas;

tempering the portion of the quenched off-gas passing to the low-temperature drying chamber to lower the temperature thereof for accommodating the temperature sensitive agglomerates therein.

24. A process according to claim 23, including the step of:

scrubbing the kiln off-gas prior to modifying the temperature thereof with a sorbent material reactive with sulfur.

25. A process according to claim 24, including the step:

of tempering the kiln off-gas prior to it being scrubbed to modify the temperature of the kiln off-gas for ensuring the reaction of the sorbent material with the sulfur in the gas and reduce the potential for fusion of dust particles in the gas stream.

26. A process according to claim 20 including the step of:

adding off-gas from the negative-pressure wind box of the low-temperature drying zone to the quenched gases prior to the quenched gases being passed to the high-temperature drying zone.

* * * * *